US007849317B2

(12) United States Patent
Euchner et al.

(10) Patent No.: US 7,849,317 B2
(45) Date of Patent: Dec. 7, 2010

(54) METHOD FOR MAIL ADDRESS BLOCK IMAGE INFORMATION ENCODING, PROTECTION AND RECOVERY IN POSTAL PAYMENT APPLICATIONS

(75) Inventors: James A. Euchner, Waccabuc, NY (US); Murray D. Martin, Ridgefield, CT (US); Leon A. Pintsov, West Hartford, CT (US)

(73) Assignee: Pitney Bowes Inc., Stamford, CT (US)

( * ) Notice: Subject to any disclaimer, the term of this patent is extended or adjusted under 35 U.S.C. 154(b) by 866 days.

(21) Appl. No.: 10/582,741

(22) PCT Filed: Dec. 15, 2004

(86) PCT No.: PCT/US2004/041943

§ 371 (c)(1),
(2), (4) Date: May 4, 2007

(87) PCT Pub. No.: WO2005/059753

PCT Pub. Date: Jun. 30, 2005

(65) Prior Publication Data

US 2007/0288760 A1 Dec. 13, 2007

Related U.S. Application Data

(60) Provisional application No. 60/529,726, filed on Dec. 15, 2003.

(51) Int. Cl.
*H04L 9/00* (2006.01)
*G07B 17/04* (2006.01)

(52) U.S. Cl. ........................................ 713/176; 705/62

(58) Field of Classification Search ................. 713/189; 705/62

See application file for complete search history.

(56) References Cited

U.S. PATENT DOCUMENTS

| | | | | |
|---|---|---|---|---|
| 4,649,541 | A * | 3/1987 | Lahmeyer | 714/784 |
| 5,835,604 | A * | 11/1998 | Lee | 380/51 |
| 6,125,357 | A * | 9/2000 | Pintsov | 705/408 |
| 6,175,827 | B1 * | 1/2001 | Cordery et al. | 705/410 |
| 6,209,115 | B1 * | 3/2001 | Truong et al. | 714/784 |

FOREIGN PATENT DOCUMENTS

| | | | |
|---|---|---|---|
| EP | 0782108 | A2 | 7/1997 |
| EP | 0952558 | A2 | 10/1999 |
| WO | 0065541 | A1 | 11/2000 |

* cited by examiner

*Primary Examiner*—Gilberto Barron, Jr.
*Assistant Examiner*—Yonas Bayou
(74) *Attorney, Agent, or Firm*—Michael J. Cummings; Angelo N. Chaclas

(57) ABSTRACT

The present invention uses an element of digital data that is created during digital postage mark (DPM) generation process from the digital image of the destination address block. The digital data is included into recoverable portion of the digital signature and imprinted on a mailpiece. During DPM verification, a representative portion of a destination address block image is retrieved in its original form from the digital signature itself. The retrieved portion of the image then can be compared with the similar digital data obtained from the scanned destination address block obtained during normal mail scanning and processing activities. If the comparison is under a predetermined threshold, then the DPM is declared authentic and the mailpiece can be processed and delivered with confidence. If, on the other hand, the threshold is not met, the DPM is declared a copy or a counterfeit of another DPM and the mailpiece can be subjected to further investigation.

6 Claims, 8 Drawing Sheets

METHOD FOR MAIL ADDRESS BLOCK IMAGE INFORMATION ENCODING, PROTECTION AND RECOVERY IN POSTAL PAYMENT APPLICATIONS

CROSS-REFERENCE TO RELATED APPLICATIONS

This application claims the benefit of U.S. Provisional Application Ser. No. 60/529,726, filed on Dec. 15, 2003, the specification of which is hereby incorporated by reference.

FIELD OF THE INVENTION

The present invention relates generally to an efficient mail processing and verification system and, more particularly, to a system and method for verification of cryptographically generated information where data necessary for duplication detection is in the form of the address block digital image.

Postage metering systems print and account for letter mail postage and other unit value printing such as parcel or flat delivery service charges and tax stamps. These systems have been both electronic and mechanical. Some of the varied types of postage metering systems are shown, for example, in U.S. Pat. Nos. 3,978,457; 4,301,507 and, 4,579,054. Moreover, other types of metering systems have been developed which involve different printing systems such as those employing thermal printers, ink jet printers, mechanical printers and other types of printing technologies. Examples of these other types of electronic postage meter are described in U.S. Pat. Nos. 4,168,533 and 4,493,252. These printing systems enable the postage meter system to print variable alphanumeric and graphic type information.

Card controlled metering systems have also been developed. These systems have employed both magnetic strip type cards and microprocessor-based cards. Examples of card controlled metering systems employing magnetic type cards include U.S. Pat. Nos. 4,222,518; 4,226,360 and, 4,629,871. A microprocessor ("smart card") based card metering system providing an automated transaction system employing microprocessor bearing user cards issued to respective users is disclosed in U.S. Pat. No. 4,900,903. Moreover, systems have also been developed wherein a unit having a non-volatile read/write memory which may consist of an EEPROM is employed. One such system is disclosed in U.S. Pat. Nos. 4,757,532 and 4,907,271.

Postage metering systems have also been developed which employ cryptographically protected information printed on a mail piece. The postage value for a mail piece may be cryptographically protected together with other data by computing a Cryptographic Validation Code (CVC) that is usually included in a Digital Postage Mark (also referred to herein as a DPM). The Digital Postage Mark is a block of machine (and sometimes also human) readable information that is normally present on a mail item in order to provide evidence of paid postage (more precisely evidence of appropriate accounting action by the mailer responsible for the mail item). A CVC is a value that represents cryptographically protected information, which authenticates the source of data (e.g. a postage meter and sometimes its user) and enables verification of the integrity of the information imprinted on a mail piece including postage value. Another term sometimes used for the CVC is a digital token. Examples of postage metering systems which generate and employ CVCs are described in U.S. Pat. Nos. 4,757,537; 4,831,555; 4,775,246; 4,873,645 and 4,725,718 and the system disclosed in the various United States Postal Service published specifications such as Information Based Indicium Program Key Management System Plan, dated Apr. 25, 1997; Information Based Indicia Program (IBIP) Open System Indicium Specification, dated Jul. 23, 1997; Information Based Indicia Program Host System Specification dated Oct. 9, 1996, and Information Based Indicia Program (IBIP) Open System Postal Security Device (PSD) Specification dated Jul. 23, 1997.

These systems, which may utilize a device termed a Postage Evidencing Device (PED), employ a cryptographic algorithm to protect selected data elements by using the CVC. The information protected by the CVC provides security to detect altering of the printed information in a manner such that any unauthorized change in the values printed in the postal revenue block is detectable (and importantly automatically detectable) by appropriate verification procedures.

Typical information which may be protected as a part of the input to a CVC generating algorithm includes the value of the imprint (postage), the origination zip code, the recipient addressee (destination) information (such as, for example, delivery point destination code), the date and a serial piece count number for the mail piece. These data elements when protected by using CVC (which is generated by applying a secret or private key) and imprinted on a mail piece provide a very high level of security which enables the detection of any attempted modification of the information in the Digital Postage Mark also known as postal revenue block, where this information may be imprinted. These digital metering systems can be utilized with both a dedicated printer, that is, a printer that is securely coupled to an accounting/cryptographic module such that printing cannot take place without accounting and the printer can not be used for any purpose other than printing DPM, or in systems employing non-dedicated printers together with secure accounting systems. In this latter case, such as the case of personal (PC) or network computing systems (realized as wide area or local area), the non-dedicated printer may print the DPM as well as other information.

CVCs need to be computed and printed, for example, in the DPM for each mail piece. The CVC computation transformation requires a secret (or sometimes it is also called private key), that has to be protected and may be periodically updated. In digital metering systems, the CVCs are usually computed anew for every mail piece processed. This computation with secret (symmetric) key involves taking input data elements such as mail item serial piece count, value of the ascending register, date, origination postal code and postage amount and encrypting this data with secret keys shared by the digital meter (a.k.a. postage evidencing device or PED or Postal security Device or PSD) and postal or courier service and by the Postage Evidencing Device and device manufacturer or vendor. This sharing requires coordination of key updates, key protection and other measures commonly referred to as a symmetric key management system. The computation of the CVC takes place upon request to generate a DPM by a mailer. This computation is performed by the PSD or PED. Thus, the PSD needs to have all the information required for computation, and, most significantly, encryption key(s). Moreover, refilling the meter with additional postage funds sometimes also requires separate key and a key management process.

Various enhanced systems have been developed including systems disclosed in U.S. Pat. Nos. 5,454,038; 5,448,641 and 5,625,694, the entire disclosures of which is hereby incorporated by reference.

As noted above, it has been recognized that computerized destination address information can be incorporated into the input to the CVC computation. This enables protection of such information from alteration and thus provides basic and fundamental security. The inclusion of the destination address information in the CVC insures that for an individual to perpetrate a copying attack by copying a valid DPM from one mail piece onto another mail piece without payment and entering the mail piece with copied DPM into the mail stream, the fraudulent mail piece must be addressed to the same addressee as the original valid mail piece. The inclusion of destination address information enables automatic detection of unauthorized copies. If this has not been done, the fraudulent mail piece would not be detectable (as having an invalid DPM upon verification at a mail processing facility) without creation and maintenance of huge data bases containing identities of all previously accepted and processed mail items.

It has also been recognized that a level of enhanced security can be obtained by generating the CVC using a subset of destination address information. This concept is disclosed in published European Patent Application Publication No. 0782108, filed Dec. 19, 1996 and published Jul. 2, 1997. The published European application discloses, inter alia, the use of the hash code of a predetermined appropriate part of each address field as an input to the CVC computation process. It is suggested that the first 15 characters of each line can be selected as such appropriate part of each address field for authentication purpose. It is also suggested that an error correction code is generated for the selected address data using, for example, Reed Solomon or BCH algorithms. A secure hash value (e.g. a value computed by using SHA-1 algorithm (or Secure Hash Algorithm) in accordance with ANSI X9.30.2-1997 Public Key Cryptography for the Financial Industry—Part 2: The Secure Hash Algorithm (SHA-1) of this part of the address field data is generated, which is sent to a vault (a.k.a. Postal Security Device) along with the requested postage and other appropriate data as described above. This information, pre-defined portion of the address field, is a part of a request for the DPM generation. The PSD, which may be coupled to a personal computer (PC), generates the CVC using this data. The error correcting code is printed on the mail piece in alphanumeric characters or bar code format. During a verification process, an OCR/Mail Processing System reads the delivery address from the mail piece and the data from the DPM. Using an OCR or bar code reader, the error correcting code is also read. An error-correction algorithm is executed using the read error correcting code. If errors are not correctable, then the recognition and control process is notified of a failure. If errors are correctable, the appropriate section of each address field is selected for authentication. A secure hash value of the selected data is generated during the verification process. A secure hash value and the postal data are then sent to the verifier which then generates a CVC that is compared to the CVC printed on the mail piece to complete the verification process. (If two CVCs are identical the mail piece is accepted and verification process terminates and if they are not the mail piece is rejected). The use of error-correction algorithm is motivated by the requirement that all data that needs protection has to be hashed before it can be encrypted using a digital signature algorithm. One of the main improvements of the present patent application lies in the use of a new hybrid digital signature scheme that avoids hashing of at least one part of the data that has to be digitally signed. This allows a room for at least some errors in the address recognition process without any sacrifices of the application security.

The critically important requirement for digital metering is user-friendliness and low cost. Traditional systems of copy attack detection employ destination address information incorporation into the CVC computation. Such is the IBIP system developed by USPS referenced above. The IBIP system requires the use of 11 digit postal ZIP code (delivery point postal code) as the destination address-identifying element. This requirement creates several significant problems. First, up to 20% of all US postal addresses do not have 11 digit ZIP code (e.g. apartments in apartment buildings or mail locations in office buildings). Second, all foreign addresses do not have 11 digit ZIP code. Third, the database containing 11 digit ZIP codes must be regularly updated since postal addresses may change their ZIP codes. The USPS IBIP specification requires that in order to use digital metering in PC-based system (a.k.a. "open" systems) mailers must use a certified postal address database that must be updated at least quarterly. These requirements represent significant and in some cases fatal inconvenience to mailers. As a result PC-based digital metering is grossly disadvantaged compared to other methods of postage evidencing. For example, if mailer is using a full value first class postage and do not provide any postal ZIP code in the destination address, he/she is still entitled to full spectrum of delivery services from USPS or other carriers as appropriate. Furthermore, in many cases users of PC-based or other digital metering systems do not have access to computerized destination address information or, for the reasons of convenience, time and cost, do not want to enter such information into their digital metering systems. In these cases the security of the postal revenue collection system relies entirely on a secure linkage between printing and accounting and, possibly, on an extensive postal duplicate detection process using large data bases that store unique identities of all already processed mail items.

Previously known solutions to the problem of Digital Postage Mark (DPM) duplication (also known as copying or replay) fall into 3 categories.

First category involves printing in the DPM additional (sometimes hidden) information that would be difficult to reproduce using conventional printing means. A good example of this solution is Digital Watermarks (see "Information Hiding", edited by S. Katzenbeisser and F. Petitcolas, Artech House, Norwood, Mass., 2000 pp. 97-119). The main disadvantages of Digital Watermarks are twofold. First, Digital Watermarks are still reproducible by dishonest mailers albeit with significantly more difficulty because the cost of reproducing them is higher than simple copying of DPM using a conventional copier or a scanner/printer combination. Second, the automated verification of Digital Watermarks in large quantities requires high resolution specialized and possibly slow scanning equipment. Such equipment is normally not employed by Posts in their mail processing facilities and could be very costly. Employment of such scanners as a general mail scanning apparatus would jeopardize traditional mail sorting since such scanners would capture mach more information that is needed for sorting and thus would require significantly more computing power to process such information.

The second category of copy protection techniques makes use of the destination address information as a piece of information uniquely indicative of the mail item. As it was noted above, the use of a sufficiently deep (e.g. uniquely indicative of delivery point) postal code as an address identifier (such as for example 11 digit ZIP code in USA that is uniquely indicative of the recipient mail box) is extremely (and sometimes fatally) inconvenient for mailers. On the other hand, the use of the full destination address information (e.g. in ASCII format) from the postal verification viewpoint is very difficult because this information in practice can not be recreated during the DPM verification process without at least some errors. It has been discovered that many mail pieces have destination addresses that are difficult and sometimes impossible to fully read, such that the DPM (including the CVC) imprinted on the mail piece cannot be verified. These conflicting requirements brought discovery of an Address Identifier (AI) system described in U.S. Pat. No. 6,175,827, issued Jan. 16, 2001. It makes use of certain additional information (such as a structure of the destination address block) and error correction codes to significantly improve robustness of the automatic address reading. This process works in practice but it is not always economical because of the amount of additional information that must be generated, imprinted and processed including computation of error correction codes for a broad variety of addresses. Another disadvantage of the Address Identifier systems is the fact that known error correction codes are not designed to work with text processing systems and therefore are not optimal. Besides, such Address Identifier systems still must be robust enough, so that they can be reproduced without errors even in a relatively error-prone OCR address recognition systems. The Address Identifier is first computed from the address information and then hashed and encrypted (digitally signed) along with other data elements that require protection. The robustness of the Address Identifier could not always be guaranteed and the error recovery process can become an essentially manual exercise, slow and costly.

The third category for solving the copy protection problem, which is described in pending U.S. patent application Ser. No. 10/456,416, filed Jun. 6, 2003, makes use of Digital Signatures schemes with partial message recovery but requires input of computerized destination address information on the part of the mailer during mail generation process. In this context and everywhere below the computerized destination address information is defined as a string of characters that are fully encoded according to one of the standard character encoding scheme such as ASCII or EBCDIC. Thus, the third approach requires that mailer must have computer-encoded string of characters representing destination address for the mail piece at the time of mail creation. This excludes, for example, handwritten or already pre-printed destination addresses that mailer may wish to use for sending his/her mail pieces. Of course, mailer can always enter such addresses into his computer or postage meter, but that may represent significant inconvenience. It should be noted that mailers can use some accurate OCR system to process image of the Destination Address Block and convert it to a string of characters before computing CVC. This case then become analogous to the case described in the aforementioned U.S. patent application Ser. No. 10/456,416, but this may represent also a cost and processing inconvenience for mailers.

A first object of the present invention is to create a system that would make use of the digital image of destination address block (with or without postal codes) in order to enable detection of unauthorized (or suspect) copies of the DPM based solely on the information available on the mail item itself.

Another object of the present invention is to develop a general technique for authentication and data integrity protection of information contained in digital images. In the general field of digital image processing there are known techniques designed for image indexing, storage and retrieval using image indexing. Digital image indexes created according to the present invention would not only enable storage and retrieval of digital images but also enable verification of authenticity and data integrity of the information present in indexed images.

SUMMARY OF THE INVENTION

The present invention relates to robust Digital Postage Mark (DPM) verification systems, increasing the percentage of mail pieces where automatic DPM verification can be achieved, even when destination addressee information is not computerized (e.g. not represented in ASCII format) during mail item creation process and may not be able to be recreated error-free during DPM verification process. The present invention also delivers enhanced ability to automatically capture addressee block information during mail sorting operation by providing on each mail piece in addition to address block itself some or all destination address image information in other areas of the mail piece.

The approach taken in the present invention avoids all the issues and difficulties of Digital Watermarks, Address Identifiers and computerized destination address data.

The main idea of the present invention is to hide (during the mail creation/finishing process) some (uniquely representative) portion of the digital image of the destination address block inside the Digital Signature evidenced in the CVC portion of the Digital Postage Mark. This can be accomplished using Digital Signatures schemes with partial message recovery. One known example of such a signature is described in ANSI X9.92-2001 Draft Standard "Public Key Cryptography for the Financial Services Industry: PV-Digital Signature Scheme Giving partial Message Recovery".

The present invention makes use of an element of digital data defined as the Robust Address Block Image Digest (or RABID) that is created during DPM generation process from the digital image of the destination address block. The RABID is then included into recoverable portion of the digital signature and imprinted or otherwise attached to the mail item.

During the DPM verification process the representative portion of the Destination Address Block Image (that is RABID) can then be retrieved in its original form from the digital signature itself assuming that the digital signature (CVC) is represented in a highly readable code such as, for example, PDF417 or DataMatrix two-dimensional bar codes. The retrieved portion of the image then can be compared with the similar RABID portion obtained from the scanned destination address block obtained during normal mail scanning and processing activities and their proximity to each other can be determined. If they are close (in the sense of a pre-defined proximity measure defined below), then the DPM is declared authentic and postage is judged to be paid by the mailer and the mail piece can be processed and delivered with confidence. If, on the other hand, they are not close, the DPM is declared to be a copy or a counterfeit of another DPM and the mail piece can be subjected to further investigation, perhaps using forensic or other means.

The proximity measure (or a distance function) between two portions of the destinations address block image obtained from two different sources can be, for example, a Hamming distance or any other suitable proximity measure or distance.

The main advantage of the process of using Digital Signatures schemes with partial message recovery is the fact that it avoids hashing of the recoverable portion of the message and thus avoids the major source of errors associated with the Address Identifier approach. This process is also very economical in the size of the Digital Signature avoiding any significant increase in the footprint of the DPM. Thus, this process is uniquely suited for applications involving DPM copies detection, since it is robust and flexible and does not impose an overhead cost of a large footprint of imprinted data.

Thus, it has been discovered that the objective of linking the DPM with the mail piece itself through its destination address can be substantially satisfied, worldwide, for all categories of mail, domestic and international, without employing the United State Postal Service eleven digit destination point delivery code (DPDC) or its equivalents or computerized destination address information at all.

It has also been discovered that the new method does not require access to the regularly updated large address databases and works for all mail items regardless of their destination by detecting unpaid mail items, and simultaneously allowing processing of legitimately paid items even undeliverable as addressed, in this case supporting determination of their undeliverability.

It is important to notice that due to its image nature the method of present invention works equally well with non-European addresses, i.e. addresses presented in the form of Asian hieroglyphs (such as Kanji or Hiragana).

It is another object of the present invention to provide a practical universal system for linking a mail piece identity to a CVC.

BRIEF DESCRIPTION OF THE DRAWINGS

A complete understanding of the present invention may be obtained from the following detailed description of the preferred embodiment thereof, when taken in conjunction with the accompanying drawings, wherein like reference numerals designate similar elements in the various figures, and in which.

DETAILED DESCRIPTION OF THE PREFERRED EMBODIMENT

Figure 1:
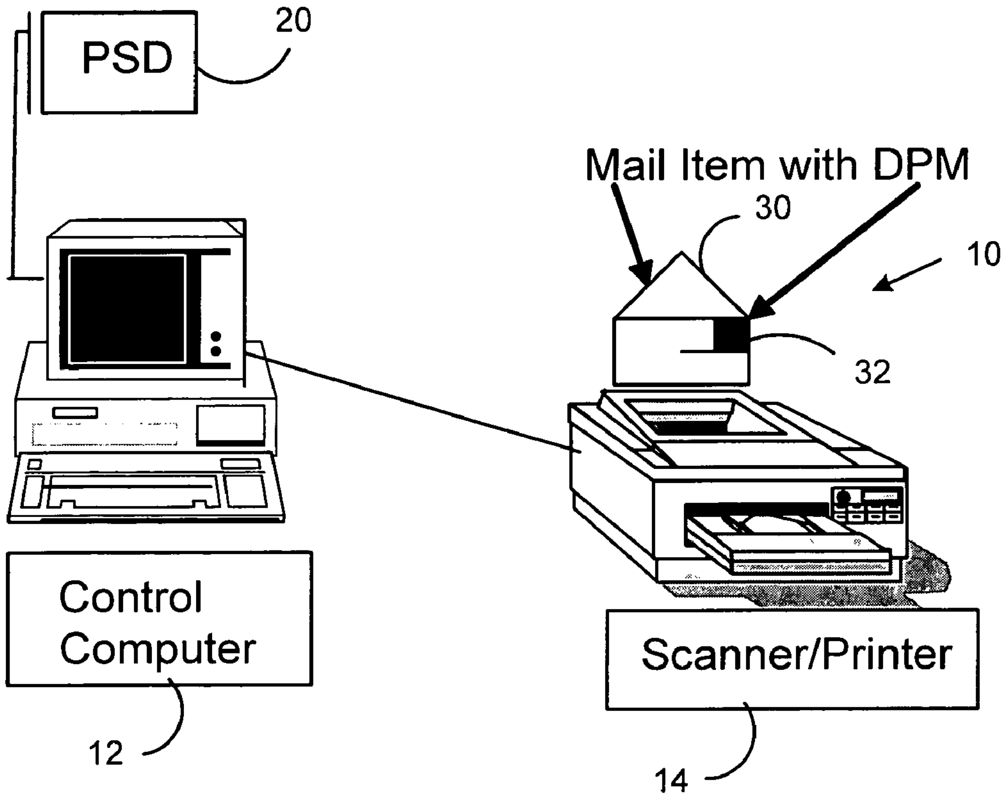
FIG. 1 is a block diagram of a system for creating, and printing mail pieces with DPM that embodies the present invention.

The main purpose of the DPM is to evidence that postage for a given mail item has been paid or properly and securely accounted for and will be paid in the future. Various implementations for the DPM have been proposed. In selecting an implementation, it is desirable that the DPM satisfy the following set of requirements:

1) Information printed in the DPM should be linked with payment or secure accounting for the due postage.
2) Each DPM should be unique.
3) Each DPM should be robustly linked with the mail item for which it provides evidence of payment.
4) The DPM verification process should be simple and effective, e.g., it should be completely automated except for mail pieces requiring special handling or attention or (if desired) it should be a simple manual process that can be performed by mail carriers who handle mail for delivery. In practice this requirement translates into mail item self-sufficiency, i.e. full sufficiency of the information present on the item for its DPM verification.

The first requirement is usually satisfied using cryptographic techniques. In its simplest form the link between the payment and the DPM is achieved by printing in the DPM cryptographically protected information that authenticates the information imprinted on the mail piece (the CVC) that can be computed only by the device in possession of secret and protected information (a cryptographic key). This key serves as an input to an algorithm producing, for example, a message authentication code (MAC) or a Digital Signature. Each access to the key results in accounting action such as, for example, the subtraction of the postage value requested by the mailer from a postage accounting register holding prepaid postal money.

The second requirement provides a reference mechanism for detection of unauthorized duplication/copying of the DPM. Printing a unique identification on each mail piece satisfies this requirement.

The third requirement is desirable in order to simplify the detection of reused or duplicate indicia. In particular, it is very desirable to achieve the verification of the DPM without access to any external sources of information, such as databases of already used and verified DPMs. This requirement considerably simplifies means for satisfying the last requirement. Postage meters usually meet this requirement either by the use of printers securely linked to accounting means and specialized printing inks, or by linking information on the mail piece itself to the DPM.

The present invention, as described herein, addresses the requirement of the linkage between the mail piece data and the DPM. This linkage has been provided by inclusion in the CVC of data that is unique to a mail piece. Of all the data normally present on the mail items, there is only one candidate of such unique data, namely the destination address. By incorporating an image of the destination address into the CVC along with other relevant information such as date, postage amount and device identification, the PSD effectively eliminates possibility of reusing once issued (and paid for) DPM information for unpaid mail pieces, with the exception of mail pieces destined to exactly the same address on the same day (and possibly time). This last possibility on the one hand subjects the attacker to a high risk of detection, for example, by direct examination of mail items by a mailman, i.e., a delivery person, since mail pieces that are addressed to the same addressee on the same day are easily observable, while on the other hand deliver little economic benefit to the attacker. Thus, it is highly desirable to include the destination address image data into the input to the CVC computation and in doing so protect destination address information from undetectable alteration.

Pintsov-Vanstone (PV) Digital Signature Scheme with Partial Message Recovery

Pintsov-Vanstone Digital Signature Scheme with Partial Message Recovery is described in detail in a draft *American National Standard ANSI X*9.92-2001 *Public Key Cryptography for the Financial Services Industry: PV-Digital Signature Scheme Giving Partial Message Recovery*. This Signature scheme provides a foundation for the present invention.

In the DPM applications, all messages (i.e. informational messages) that need to be signed have a fixed short size, typically smaller than 160 bits (20 bytes). Under this assumption, it has been discovered that the PV-Digital Signature scheme with partial message recovery seems to be the most appropriate security mechanism for mailing application. The description below is given for the PV-Digital Signature algorithm using Elliptic Curve Cryptographic scheme. It should be expressly noted that other signature algorithms based on the difficulty of solving discrete logarithm problem or any signature algorithms with partial message recovery are equally suitable for the purpose of present invention. These include, for example, DSA algorithm specified in *ANSI X*9.30-1 *Public Key Cryptography for the Financial Services Industry—Part* 1*: Digital Signature Algorithm* (*DSA*). This and other standards referenced in the present patent application are available from American National Standards Institute, ABA, Standards Department, 1120 Connecticut Avenue, N.W. Washington, D.C. 20036.

Below, the plaintext that needs to be signed is designated as Postal Data or PD. First the plaintext PD is divided into two parts, namely a part C that represents data elements that in addition to being protected by signature can be recovered during the verification process from the signature itself and a part V that contains data elements available in the plaintext within the DPM. This means that $$PD=C\|V,$$

where operation "‖" as usual means concatenation.

It is noted that the integrity of the data elements in V is also protected since V is also signed. This separation of the PD into two parts fits our application perfectly. Due to a variety of traditional, marketing, postal accounting, appearance and human readability requirements, some data elements in the DPM and on the mail item itself must be present for immediate visual examination (e.g. by the recipient). These data elements include destination address, date, postage value and the postal code of location where mail piece was originated. These elements with the exception of the destination address are candidates for the part V. Other data elements such as the destination address, value of a serial piece count, the value the ascending register, e-mail address of the sender and/or recipient, telephone or fax number of the sender and the like can form the part C. These data elements allow for a cost effective organization of a number of special postal services such as a proof of deposit and delivery and mail tracking and tracing. However, since V is going to be hashed, V can be extended for all desired elements as long as they are present in a plaintext form elsewhere in the DPM or on the mail item itself. For the purpose of the present invention, the part C comprises critical information about digital image of mail item destination address, i.e., Robust Address Block Image Digest (or RABID) portion of the address block image fully described below.

The setup for the signature scheme is as follows. Let P be a public point of order n in the group of points of the elliptic curve E (Fq) over the finite field Fq (the total number N of points on the curve is divisible by n). For security reasons minimal size for n is approximately 20 bytes (160 bits). Such elliptic curve cryptographic scheme setting is referred to below simply as 160 bit elliptic curve. Each mailing system, such as the system generally designated 10 in FIG. 1, has an identity. As used herein, mailing system 10 has an identity IA. The identity IA may contain a number of additional parameters and attributes besides strictly identification information for the system (comprising computer 12 and scanner/printer 14), its PSD 20 and mailer's identity itself. These parameters depend on application requirements and may include an expiration date, allowed maximum postage value or allowed maximum number of DPMs to be produced by the terminal, an indication of allowed geographical area where a mail item 30 (with DPM 32) produced by the terminal can be deposited, etc. The identity IA is assigned prior to the beginning of operations by the Post or a designated by the Post registration authority such as a vendor trusted by the Post. The identity IA is printed in the PD portion of DPM in plaintext.

It is assumed that the Post either functions as a Certificate Authority (CA) or uses one of the established Certificate Authorities. In its capacity as a CA, the Post generates a random integer c between 0 and n. The integer c is the postal system wide private key. The corresponding postal system wide public key is B=cP. In this case, the secrecy (confidentiality) of c against cryptanalysis is as usual protected by the difficulty of elliptic curve discrete logarithm problem.

The mailing system 10 generates a random positive integer kA<n, then it computes the value kAP and sends this value to the Post or a registration authority using, for example, a public communication network such as Internet. It is noted that this phase could in fact be done using a long-term private/public key pair from a more traditional X.509 certificate key pair. This can be done once for a given period of time or for a given number of authorized DPMs that can be generated by the terminal.

The Post generates a random positive integer $c_A$ smaller than n and the computes the point $\gamma_A$ on the curve $$\gamma_A=k_AP+c_AP,$$

In mailing applications, the value $\gamma_A$ is called "Optimal Mail Certificate or OMC".

Next the Post computes another value $$f=H(\gamma_A\|I_A),$$

where H is a hash function. Hash function H could be any suitable hash function, for example, SHA-1 described in *ANSI X*9.30.2-1997 *Public Key Cryptography for the Financial Industry—Part* 2: *The Secure Hash Algorithm* (SHA-1) and "‖" denotes the operation of concatenation. At this point, various restrictions on the data included in $I_A$ and in the DPM can be tested. The Post then computes its input $m_A$ to the mailer's private key a as follows:

$$m_A=cf+c_A \bmod n$$

and sends values $\gamma_A$, $m_A$ and $I_A$ to the mailer's terminal A. This portion of the protocol is executed once for a period of time prior to mail generation/verification operation.

The mailer's terminal A computes its private key a and its public key $Q_A$ as follows:

$$a=m_A+k_A \bmod n=cf+k_A+c_A \bmod n$$

$$Q_A=aP=cfP+\gamma_A=fB+\gamma_A$$

This is also done once for a period of time determined by security and application considerations.

The private key a is used by mailing system 10 to compute the validation code CVC from the plaintext PD using a digital signature with partial message recovery described below. Observe that the private key a is a function of a postal system wide private key c and mailer-specific postal private parameter $c_A$ as well as the mailer's private parameter $k_A$. This means that both mailer and Post (or its authorized agent) participate in creation of private key a and thus make it more difficult for any intruder to compromise the private key for mailing system 10. Note also that the CVC verification key $Q_A$ is a function of only the public parameters and is computable from the OMC $\gamma_A$, postal system wide public key B and the hash value f, thus eliminating significant security requirement of protecting private keys enabling complete self-sufficiency of mail item during verification process.

DPM Cryptographic Validation Code Generation Process Using PV Digital Signature

The PV-Digital Signature generation algorithm for the message $$PD=C\|V$$

begins as usual with the generation of a random positive integer k<n by mailing system 10 (shown by a way of example in FIG. 1). The system performs the following computations:

1) R=kP;
   R is a point on the curve that is formatted as a bit sting for the transformation defined in the step 2;
2) $e=Tr_R(C)$,
   where $Tr_R$ is a bijective transformation parametrized by R and designed to destroy any (algebraic) structure that C might have. Transformation Tr may be a symmetric key encryption algorithm such as DEA or AES or simply the exclusive-or (XOR) operation if C at most the length of R (in Elliptic Curve Cryptographic Scheme based on the curve over Fq where $q=2^{160}$ R has the length of 160 bits). The secrecy of R is protected as usual by the difficulty of the discrete log problem and a random choice of k. [See *American National Standard X9.62-1999: Public Key Cryptography for the Financial Services Industry: The Elliptic Curve Digital Signature Algorithm (ECDSA).*]
3) $d=H(e\|I_A\|V)$,
   where H is a hash function and $I_A$ is the identity of mailing system 10.
4) s=ad+k(mod n),
   where a is the private key of mailing system 10 computed as described above.
5) Pair (s, e) is the signature (the validation code CVC) and it is presented for verification in the DPM together with the portion V of the plain text PD and the address block of the mail item.

Note that step 2 is computationally efficient if the size of C is less than or equal to the size of R and the transformation Tr is exclusive-or. In one embodiment of the present invention, the size of C determines how much of the destination address information can be effectively (with low overhead) hidden inside the signature and it is up to 20 bytes. This means that in the most straightforward character-encoding scheme up to 20 characters of the address information can be recovered from the CVC during verification process.

DPM Verification Process

Figure 4:
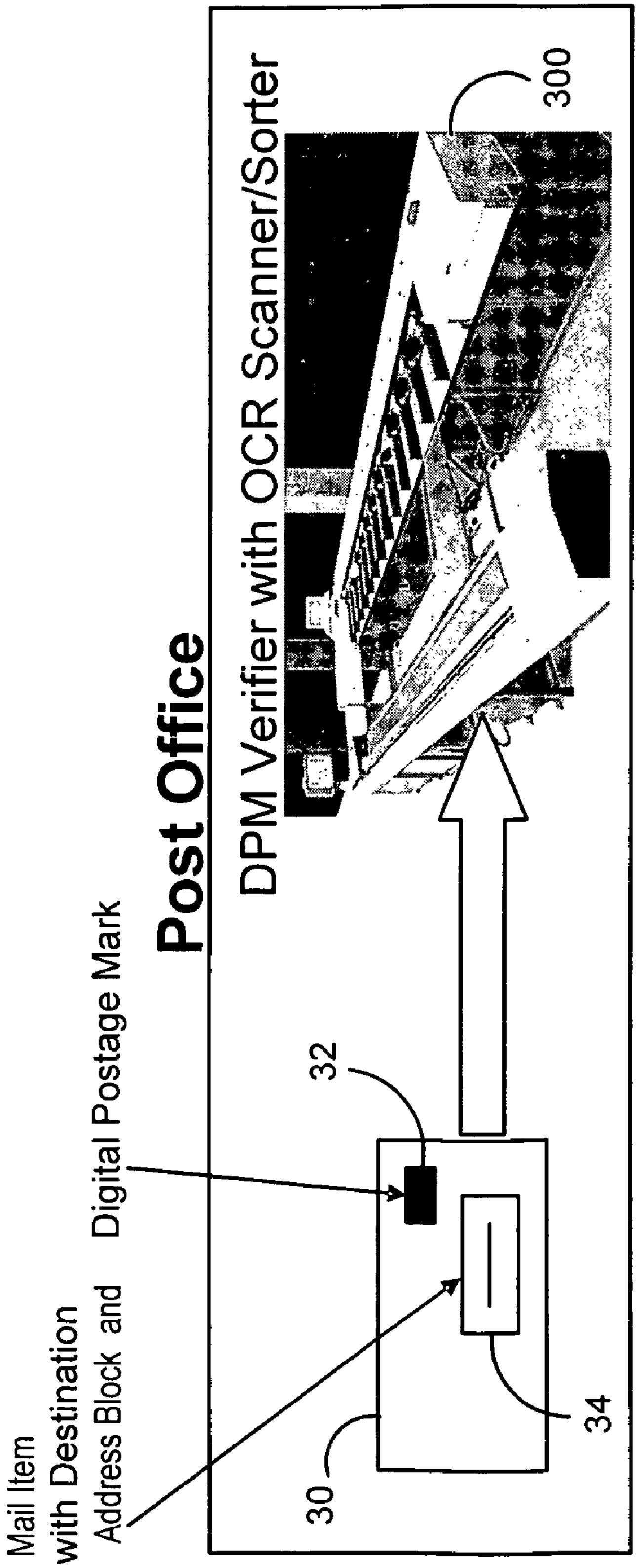
FIG. 4 is a block diagram of a system for verifying mail pieces with DPM that embodies the present invention.

The DPM verification process begins with the capture of the DPM from a mail piece together with destination address image information and parsing the DPM data into the values $I_A$, CVC=(s, e), V and $\gamma_A$. Then a postal verifier (such as shown in FIG. 4) performs the following computations:

1) $Q_A=fB+\gamma_A$,
   where $Q_A$ is the mailing system public key, the computation of which is described above, and B is the system wide postal public key; note that B does not need to be known outside of the postal verification system.
2) $d=H(e\|I_A\|V)$;
3) $U=sP-dQ_A$;
4) $X=Tr^{-1}_U(d)$, recovering a new value X by the inverse transformation $Tr^{-1}$ parameterized by the value U.
5) Check the redundancy of X, that is computed a distance between RABID of the destination address image captured form the address block and the corresponding RABID portion of X recovered from the CVC and declare C=X and accept the signature (and mail item) as valid if the distance is less than predefined and agreed upon threshold. The process of verification of redundancy and distance computation is described in detail below.

If the plaintext PD (and thus C) is small, then the PD can be "hidden" within the PV signature in its entirety. The size of C and efficiency of the computation in step 2 of the signature generation process and the size of CVC (because of the "e" portion) are connected. If C is larger than 20-bytes elliptic curve key the efficiency of signature computation can be adversely affected. However, 20 bytes of address data in C provide plenty of protection against existential forgery. Finding two different addresses with identical and carefully selected data elements each comprising 20 characters in such a way that both addresses are desirable targets for mail communication is a very difficult task. In addition, it has been discovered, as it will become apparent from the description of Distance Function in the following section, that the recoverable portion of the destination address image RABID can be changed from mail item to mail item or from day to day without adding any complexity to the verification process. This means that even if a dishonest mailer were to discover a computational method of finding two different addresses with identical recoverable RABIDs, the computational effort of finding them would have to be repeated for every mail piece and every day even for repeatable mailings. This would make it prohibitively expensive to utilize such computational method on any commercial scale that could represent even a remote danger to the integrity of postal revenue collection system. Thus, it is highly unlikely that anybody would spend large computational time and effort to find such pairs of addresses for the purpose of stealing a few dollars worth of postage. However, it also must be expressly noted that the present invention allows to increase the size of C to any desirable value and thus to achieve additional security at the expense of computational and space efficiency. Even additional artificial redundancy (beyond natural redundancy present in the structure and image of mailing addresses) can be added to the destination address image if desired. For example, some parts of the digital image can be repeated twice in the C portion of the PD so that after C has been recovered from the PV digital signature it would contain certain parts repeated twice.

In one embodiment (described below) of the present invention, it is assumed that the length of C is 20 bytes (160 bits) which delivers plentiful protection against any known forgery methods without significant adverse effect on both the size of the CVC and the computational efficiency of the DPM generation and verification processes. It is noted that in the future the security requirement for the size of elliptic curve crypto system cryptographic key will force its increase, thus allowing for corresponding increases in the size of C without any additional penalty. Since the amount of information in postal addresses is not expected to increase, this will provide for additional security without any at all extra penalty of computational or size inefficiency.

RABID and Distance Function

The present invention provides for a recovery of a prespecified portion of the digital image mail piece destination address information from the value of the PV-Digital Signature as described in the previous section (see steps 4 and 5 in the section DPM Verification Process above). As noted, this pre-specified portion of the destination address is referred to as a Robust Address Block Image Digest or RABID. Once the RABID has been obtained by the verification device from the DPM it must be compared with the corresponding RABID portion of the address block image that has been captured from the digital image of mail item' destination address block, for example, during the course of normal scanning and sorting process by mail processing equipment. This comparison process takes a form of computing the value of a distance function between two portions of the destination address image and comparing it with a threshold set up before hand by application security requirements. This section describes one method of specifying suitable RABID and a suitable distance functions. Other methods are also possible within the scope and the spirit of present invention by meeting certain general criteria. More specifically, the algorithm of computing RABID should satisfy the following requirements:

1) RABID should be easily computable during mail generation process for any address
2) RABID should be easily reproducible with reasonably high fidelity during normal mail processing/verification process;
3) Finding two significantly different addresses with identical RABIDs should be computationally difficult (i.e. very time consuming). This means finding RABIDs collisions should be materially expensive for potential perpetrators;
4) RABID should change from mail piece to mail piece and from day to day to prevent multiple use of colliding addresses in the unlikely case that they are found by potential attacker.

The algorithm for selecting recoverable portion of the destination address is referred to as the RABID Algorithm. In the description below, typical US addresses are used to illustrate the present invention. Addresses in other countries may have a different format than US addresses but they always can be formatted into a more or less similar information block suitable for the purpose of the present invention. As previously mentioned, it is important to notice that the present invention works equally well with non-European addresses as well, i.e. addresses presented in the form of Asian hieroglyphs (such as Kanji or Hiragana).

Typical mailing addresses in the western industrial world consist of several lines of characters and occupy a rectangular area with a length of 1 to 2 inches and a height (width) of 0.5 to 1 inch.

Figure 2:
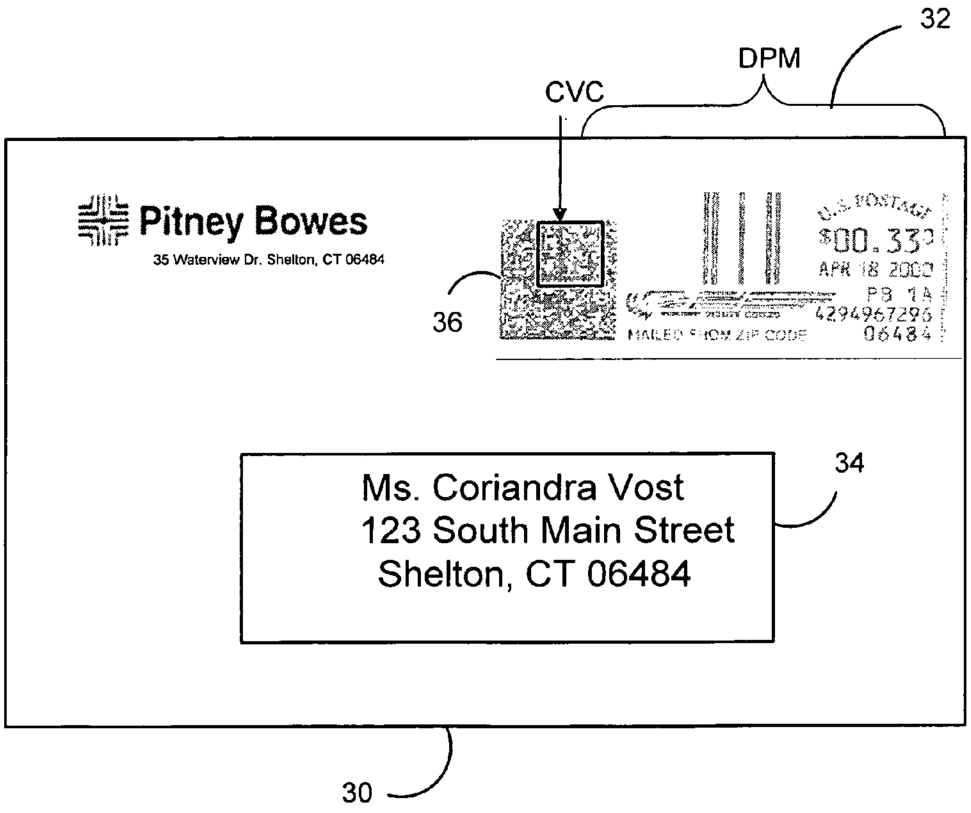
FIG. 2 is a graphic representation of a mail piece printed by the system shown in FIG. 1 and includes Destination Address Block and DPM printed in a form of a two-dimensional bar code.

Referring now to FIG. 2, consider a traditional commonly encountered postal destination address in USA. For example, normal representation of the destination address 34 on mail item 30 may look like:

Ms. Coriandra Vost
123 South Main Street
Shelton Conn. 06484

A digital binary image of this address from a computational viewpoint represents a collection of black and white picture elements (pixels). During postal processing, the digital image of the address block is normally scanned at several (typically 8) gray levels and then converted to a black and white image by the process known as binarization. One embodiment of the present invention assumes operations on binary images, but can be adopted easily for any other image representation, including gray scale images. During mail creation process the mail item or its part containing destination address block is scanned by a scanner having scanning resolution similar to the scanning resolution of scanners employed by postal processing equipment expected to process the mail item. This is typically 200-260 dots per inch. The destination address block is located in the mail item image (as a rectangular area) with its position identified with respect to the origin, that is normally for the letter mail the bottom left corner of the mailing envelope. Similar arrangements are made for parcels and other mail items that are not flat and processed by different than letter mail scanning equipment. In any case, after the address block has been located its image is binarized and parsed into lines and words. The system then generates a description of the address block in terms of the number of lines and words contained in the address. In the example above the description consists of 3 lines, with the number of words in each line beginning from the top as 3, 4 and 3 respectively. The length of each line can be measured as well together with the height of the address block. In our example above it can be 1.5 inch, 2 inches and 1.5 inch and 0.7 inch respectively.

Now data capacity that is required for the adequate representation of RABID is computed. For example, consider address with N lines, NW1 words for first line, NW2 words for the second line and so on. Assuming that NW1, NW2, . . . , NWlast can be represented by decimal number less than 8 (which covers all meaningful addresses) the total data capacity required for the line description is bounded by 3N bits, since each decimal digit less than 8 can be represented by 3 bits. For the addresses of up to 6 lines this requires 18 bits of data. Furthermore, assuming that the length in inches of each line can be sufficiently represented by 2 decimal digits each requiring 4 bits of information, the data capacity for the length information representation is 8N. For the address of 6 lines this amounts to 48 bits of data and has to be complemented by another 8 bits to represents the height of the address block in inches. Thus, the full description of the address block image in terms of its composition and size normally takes up to 18+48+8=74 bits of data. This description is referred to as Destination Address Block Profile or DABP. As it will become apparent below, DABP is further divided into computed and measured parts that are treated separately during verification routine. It is noted that the DABP, as defined herein) is highly robust in the sense that it can be reproduced with high fidelity by a broad variety of computers operatively connected to scanners with any scanning resolution. (In practice scanners used for mail creation and verification processes can be made comparable in their ability to see large and small details of the images such as address block and its connected components, i.e. words and lines). It should be also noted that any attempt by potential perpetrators to create (artificially) different addresses that would have the same composition and layout (number and length of lines, number of words etc.) by artificially breaking lines of addresses or creating extra spaces between words is easily detectable during normal address block scanning and observable during manual carrier sequencing manual sorting. Finally, it should be noted that the compositional and layout data of the address block DABP that is retrievable from the PV signature during mail scanning/sorting process is very useful in assisting mail processing equipment in avoiding parsing errors, namely errors associated with parsing address block into lines and words.

As described for the embodiment above, the recoverable portion of the PV signature is 160 bit (in 160 bit elliptic curve setting). Thus, additional 160−74=86 bits (beyond 74 bits used by DABP) are available for inclusion into RABID. To meet the requirements stated above these 86 bits should be selected in such a way that they would change from day to day, and thus prevent potential reuse of once found colliding addresses. One method that can be used here is the use of a traditional format for the date (e.g. DDMMYY) as a pointer to a location within the address block image. The DDMMYY data can be hashed (for example, by using secure hashing algorithm such as SHA-1 referenced above) to randomize it. Then certain portion of the resulting hash value can be used to specify X and Y coordinates of the desired location. For example, first 7 bits of hash value can be normalized to be a number between 0 and 1 that would represent relative value of X coordinate of the desired random location. In this case X=0 would represent leftmost position of an accessible area of the address block with respect to the origin and X=1 would represent its rightmost position. The Y coordinate is treated in exactly the same manner. It is expressly noted that the part of hash value chosen to specify (X, Y) coordinates could be any desired part of hash value (typically between 120 and 160 bits in total size). This is because all bits in the binary representation of hash value are equiprobable.

Computed in such a way (X, Y) coordinates define a location of a randomized point within the image of the address block. This location shall be referred to below as pivotal location or Pivotal Point (PP). Using pivotal point as a bottom left hand corner of a square image block, a pre-specified portion of the address block image is selected. This portion can be, for example, Z×Z pixels representing an image block of total $Z^2$ pixels. In the preferred embodiment Z=9 because 160 bits is the total amount of information that can be protected within the recoverable portion of the PV signature scheme defined over 160 bit elliptic curve finite field. Thus, an area of 9×9 pixels containing 81 bits of data is selected leaving extra 5 bits of data for redundancy purposes (from total 86 bits of data protected within PV signature after 74 bits have been used for DAPP). This Z×Z pixels portion of the image shall be referred to as the Pivotal Image or the PIVI.

Figure 3:
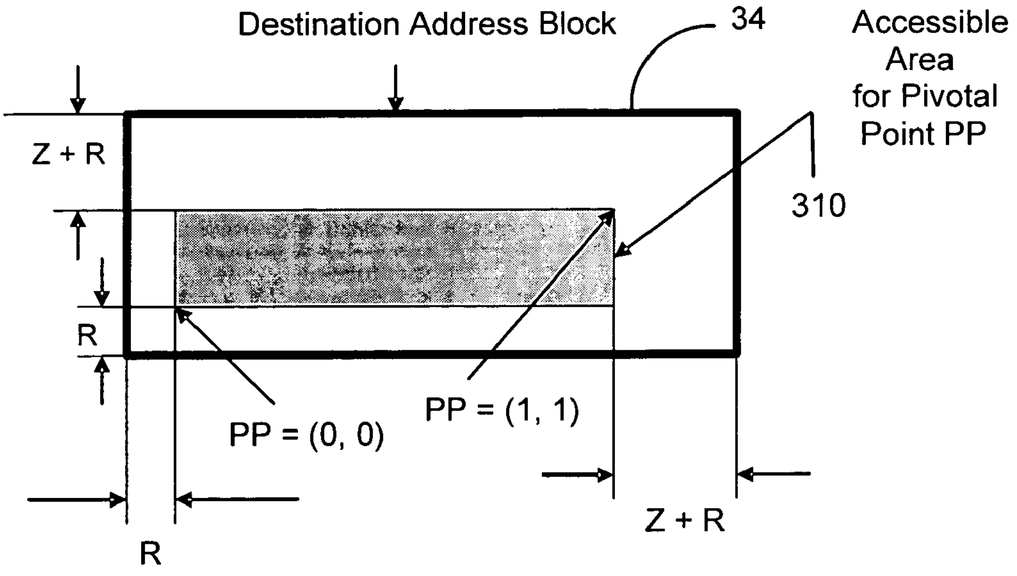
FIG. 3 Destination Address Block DAB accessible area.

In practice, the relative normalized value of X coordinate of the pivotal point PP should be between 0 and 1. Care must be taken to insure that a 9×9 pixels PIVI image with its left bottom corner at (X, Y) always fall within accessible area of the address block digital image (for both mail creation and verification processes) even in the case when pivotal point coordinates obtained during verification process from the address block are in error (i.e. not exactly matching pivotal point coordinates computed during mail creation process and retrievable from CVC (e.g. PV signature)). That means that the search area for matching two PIVIs should compensate for 9×9 image plus border area defined by maximum allowed error ($1 \leqq R \leqq Rmax$) in finding pivotal point PP during DPM verification process. This can be achieved by selecting an area (referred to as the Accessible Area) of the destination address block in such a way that the X and Y coordinates of the pivotal point are within an area smaller than the entire address block image by a pre-specified parameters. These parameters are determined by the scanning resolution and the size of the address block and the maximal allowed error R in finding pivotal point within the address block during verification process. This process insures that a correlation function between two pivotal images PIVIs obtained from two different sources can always be computed for all desired positions of the pivotal point PP within the address block as described below. FIG. 3 depicts a typical destination address block 30 with shaded area designating Accessible Area 310 for pivotal points for matching PIVIs.

PIVI is denoted as a function PIVI (x, y) where x and y coordinates take 9 values each and the value of PIVI (x, y) could be either 0 or 1 for white and black pixels respectively. In other words PIVI (x, y) is a binary square matrix with 9 rows and 9 columns. The domain of PIVI definition is over the entire image of the destination address block.

The Pivotal Block (PIVI) represents second (randomized) portion of the RABID. Thus, RABID consists of fixed (for a given address) portion of data DABP and variable portion of data PIVI, dependent on the date (and possibly time) of mailing. Robustness of PIVI recovery from the image of the address block during verification process depends on the resolution of the verification scanner. If a high resolution scanner is employed and especially if the scanning resolution of PIVI generation process is significantly mismatched with the scanning resolution of the verification scanner, finding good match even for legitimate (non duplicated pieces could be difficult) due to relatively small amount of data in the PIVI (only 81 bits). In order to achieve desirable robustness the PIVI may be computed with much coarser (and comparable resolution) during both DPM generation and verification process. For example, if scanning resolution of both processes is between 200 to 260 dpi (as in the preferred embodiment), the PIVI may be computed with the artificial scanning resolution of 70-80 dpi. This is achieved by taking, for example, 3×3 blocks of the original scanned image and "gluing" them together into one pixel whose value (black or white or 0 or 1) is determined by the average number of black (white) pixels in the 3×3=9 pixels area of the original image of the destination address block. In other words 3×3 blocks with the predominance of black pixels are declared black while the 3×3 blocks with the predominance of white pixels are declared white and. This is very similar to multi-resolution correlation technique for template matching described in the book by R. Duda and P. Hart "*Pattern Classification and Scene Analysis*", Wiley-Interscience, New York, 1973 pp. 332-334. This means that for the purpose of computing PIVI the image of the destination address block can be viewed with any desired resolution lesser than the resolution of imaging scanners employed during mail piece creation and verification processes (providing that desired resolution is integer multiple of the resolution of the originally scanned image).

Proximity measure (utilizing a distance function) should be used such that it maximizes error tolerance. Because the RABID value consists of two portions, (DABP and PIVI) the distance function used for the purpose of the present invention is divided into two separate functions that operate independently on DABP and PIVI portions of RABID. Since the extraction of DABP is very robust by virtue of the DABP definition, the first distance measure is defined simply as the difference between numbers of lines and words and their sizes respectively in the two values of DABP, one stored in the DPM information and another computed from the destination address block during DPM verification.

For example, let

NLines denote the number of lines in the address block;

NW1 denote the number of words in the first line of the address block;

NW2 denote the number of words in the second line of the address block;

NWLast denote the number of words in the last line of the address block;

LengthLine1 denote the length of the first line of the address block (in inches, millimeters or any other appropriate measurement units represented with two decimal digits as described above);

LengthLine2 denote the length of the second line of the address block;

LengthLastLine denote the length of the last line of the address block;

HeightAB denote the height (width) of the address block.

Then,

DABP=(*N*lines, *NW*1, *NW*2, . . . , *NW*Last, LengthLine1, LengthLine2, . . . , LengthLastLine, Height*AB*).

Let DABP1 be the destination address block profile computed during mail generation process and stored in the DPM as a part of the RABID1 using PV signatures algorithm as described above, while DABP2 is the destination address block profile computed during DPM verification as a part of the RABID2.

Formally,

DABP1=(1*N*lines, 1*NW*1, 1*NW*2, . . . , 1*NW*Last, 1LengthLine1, 1LengthLine2, . . . , 1LengthLastLine, 1Height*AB*);

DABP2=(2*N*lines, 2*NW*1, 2*NW*2, . . . , 2*NW*Last, 2LengthLine1, 2LengthLine2, . . . , 2LengthLastLine, 2Height*AB*).

The first distance function is defined as follows:

DABPDistance=CompDABP+MeasDABP=|1*N*Lines−2*N*lines|+|1*NW*1−2*NW*1|+|1*NW*2−2*NW*2+ . . . +|1*NW*Last−2*NW*Last|+|1LengthLine1−2LengthLine1|+|1LengthLine2−2LengthLine2 |+ . . . +|1LengthLastLine−2LengthLastLine|+|1Height*AB*−2Height*AB*|.

where || denotes absolute difference operator.

Figure 6:
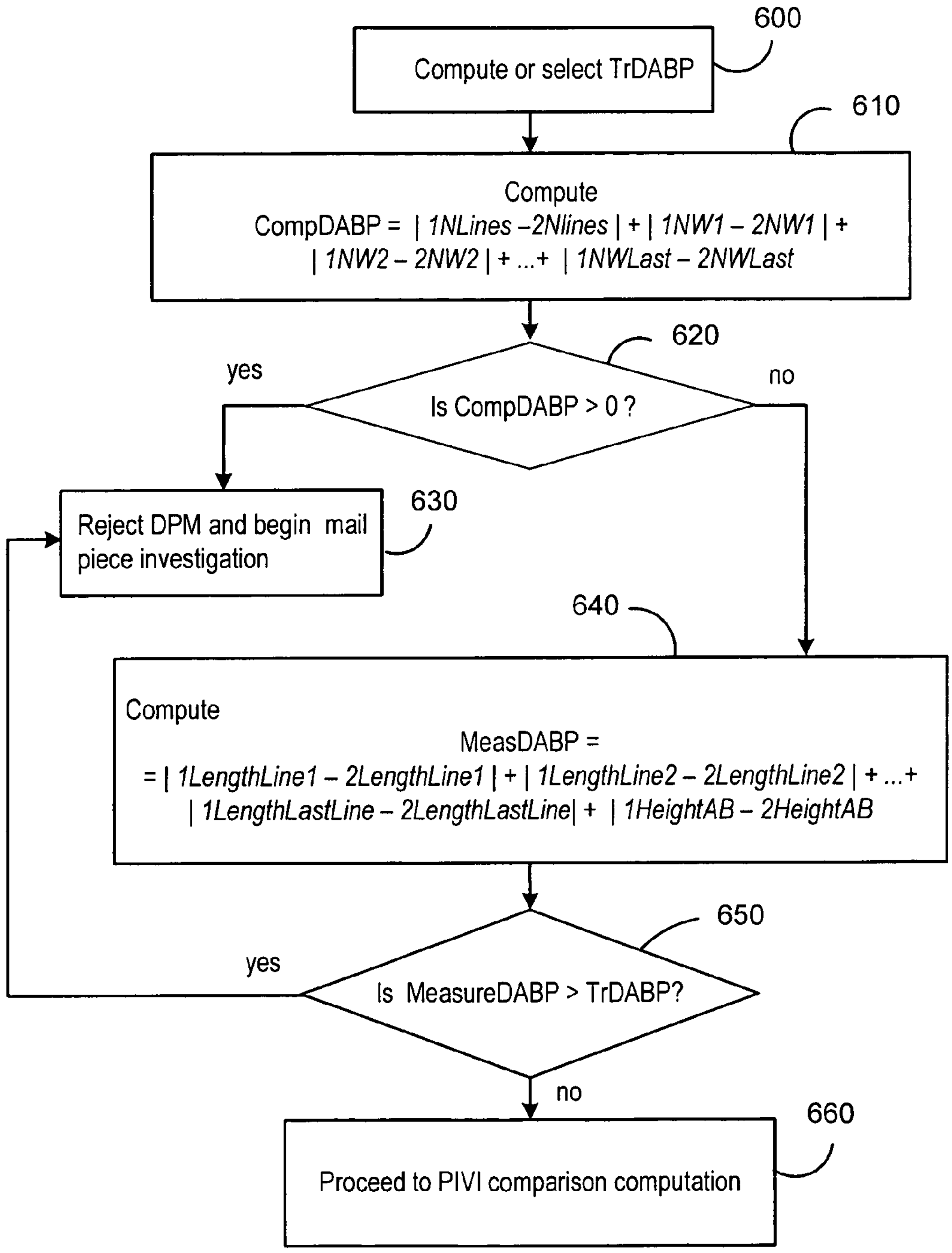
FIG. 6 is a flow chart for computation of DABP Decision Function.

DABP Decision Function:

Referring now to FIG. 6, the computation of the DABP Decision Function is shown. At step 600, a pre-specified threshold TrDABP is computed or selected. At step 610, CompDABP is computed. At step 620, if CompDABP: >0, then, at step 630, the mail piece is rejected as a suspected duplicate and a manual investigation process begins. If CompDAB=0, at step 620, then MeasDABP is computed at step 640. At step 650, if MeasDABP>TrDABP, then, at step 630, the mail piece is rejected as suspected duplicate and the manual investigation process begins. If MeasDABP≦TrDABP, at step 650, then, at step 660, a PIVI Comparison calculation is performed.

In short, the DABP Decision Function is a comparison between DABPDistance and a pre-specified threshold TrDABP resulting in the following decision function:

If CompDABP=|1NLines−2Nlines|+|1NW1−2NW1|+|1NW2−2NW2|+ . . . +|1NWLast−2NWLast|>0, Then reject the mail piece as suspected duplicate and begin manual investigation process;

If CompDAB=0 and MeasDABP>TrDABP,

Then reject the mail piece as suspected duplicate and begin manual investigation process;

If CompDAB=0 and MeasDABP≦TrDABP

Then perform PIVI Comparison calculation.

PIVI Comparison and PIVI Decision Function

The PIVI comparison calculation is based on a computation of correlation function between the binary image PIVI1 (template) obtained from the DPM and the binary image PIVI2 captured from the digital binary image of the destination address block obtained during verification process. Thus, PIV1=PIV1 (x, y) for all points (x, y) defined over 9×9 regions of destination block image (domain of the template) and PIVI2=PIVI2 (x, y) for all points (x, y) of the address block digital image. The PIVI comparison algorithm is a variant of the classic template matching technique utilizing correlation function and described, for example, in "*Pattern Classification and Scene Analysis*", by R Duda and E. Hart published by Wiley-Interscience, New York, 1973 pp. 273-284. The task of comparison between two PIVIs is simpler in the case of the present invention compared to the general task of template matching described in "Pattern Classification and Scene Analysis", by R Duda and E. Hart because in the case of the present invention the expected location of PIVI within the address block is generally known as a pre-determined (albeit randomized) function of the date of DPM imprint. In order to insure error tolerance and robustness of the process and in order to minimize the number of false alarms (when legitimately paid mail items are flagged as suspicious by the verification procedure) the process of computing correlation function is repeated multiple times using different pivotal points as a basis. The algorithm works as follows:

PIVI Comparison algorithm:

1. Retrieve Date of DPM creation DDMMYY from the DPM;
2. Using Date obtained at step 1 compute randomized coordinates (X0, Y0) of the Pivotal Point PP as described above;
3. Select Repeat Parameter R (1≦R≦Rmax) where Max is an integer that is determined by application requirements such as computational speed of verification computer and the amount of time allocated for the verification process. The repeat parameter R defines the number of correlation function computations that will be performed to achieve robustness of the matching process when only translation (shift) errors can occur. It should be expressly noted that similar correction process is established by multiple repeated computation if rotation (orientation) errors are of concern (see "Digital Image Processing" by W. Pratt, Wiley-Interscience Publication, 1991, pp 669-671). In general both sources of errors, namely translations (shifts) and rotations (orientation) can be compensated for according to the process described below. In practice computation of the small correlation function with 81 values at $4(\text{Rmax})^2$ locations is very fast and parameter Rmax can have a value between 3 and 5 resulting in the number of computed values for correlation function between 36 and 100.
4. For x=X0, x=X0+1, x=X0−1, x=X0+2, x=X0−2 . . . , x=X0+R, x=X0−R and y=Y0, y=Y0+1, y=Y0−1, . . . , y=Y0+R, y=Y0−R compute $$\text{CorrVal}(x,y)=\{\Sigma\Sigma[\text{PIVI2}(i,j)\cdot\text{PIVI1}(i-x,j-y)]\}/\{\Sigma\Sigma\text{PIVI2}(i,j)^2\}^{1/2},$$

where double summation takes place over all i and j within the domain of the translated (shifted) template PIVI1.

The result is an array of $4R^2$ values CorrVal (x, y).

It should be noted that a fast computation of CorrVal (x, y) can be performed in a frequency domain using Fast Fourier Transform. (see "Digital Image Processing" by W. Pratt, Wiley-Interscience Publication, 1991, pp 196-203)

5. Select or compute the value TrPIVI that represent desired threshold for decision concerning authenticity of the DPM. TrPIVI can be pre-determined or determined based on a tolerance for the loss of postal revenue due to the fraud, identity of the mailer or postage meter/mailing machine, postage value, amount of the noise in the scanned address block image and other or similar parameters and can be adjusted from mail item to mail item based on measured characteristics of the image such as signal to noise ratio as well as information captured from the DPM. Thus, TrPIVI is generally a function of parameters that can be measured from the image and captured from the DPM. It should be expressly noted that other application-dependent definition of threshold value TrPIVI are within the scope and spirit of the present invention 6. Compute maximum value of the correlation function for $4(Rmax)^2$ locations (x, y) in the in the image of the destination address block:

max CorrVal (x, y)

7. Compute PIVI authenticity decision function according to the following algorithm:

PIVI Decision Function:

If max CorrVal (x, y)≧TrPIVI,

Then accept DPM as valid.

If max CorrVal (x, y)<TrPIVI,

Then reject DPM and begin mail piece manual investigation.

Figure 8:
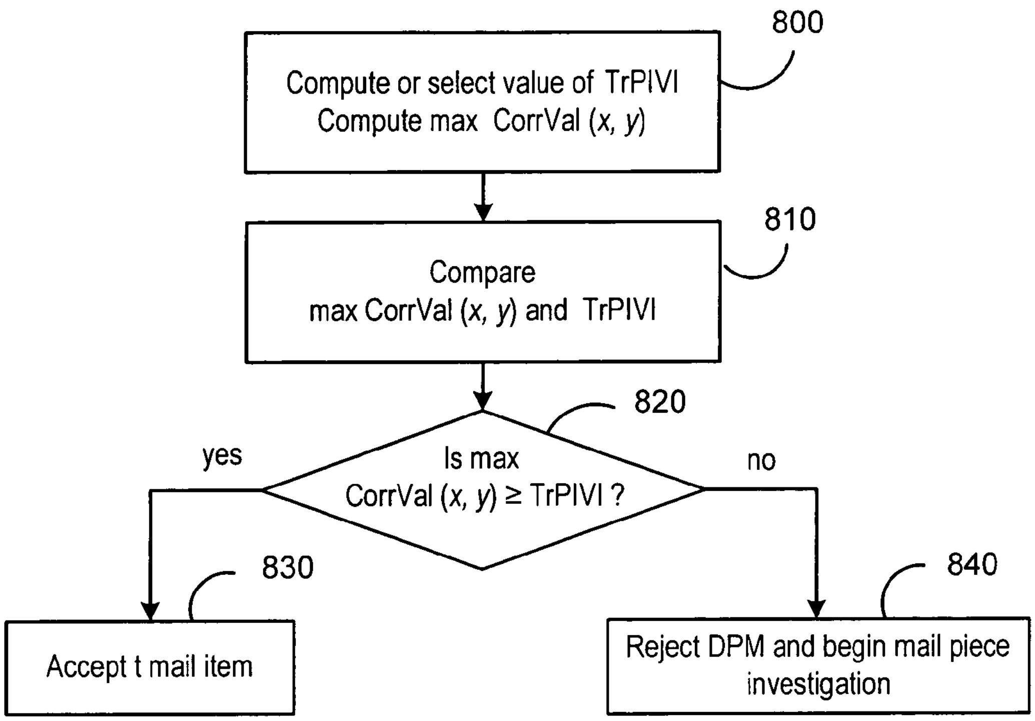

Referring now to FIG. 8, the computation of the PIVI Decision Function Computation is shown. At step 800, the value of TrPIVI is computed or selected and a maximum of CorrVal (x, y) is computed. At step 810, CorrVal (x, y) and TrPIVI are compared. At step 820, if max CorrVal (x, y)≧TrPIVI, then, at step 830, the DPM is accepted as valid. At step 840, max CorrVal (x, y)<TrPIVI, the DPM is rejected and mail piece manual investigation begins.

Mail Item Generation Process

It is assumed that in one embodiment of the present invention the mailer would be in possession of a printer equipped and a scanner capable of finding and scanning address block of the mail piece. It is assumed that the mailer also has access to a Postal Security Device (PSD) that either can be a part of the mailer's mailing system or located at a remote server site accessible from the mailing system. The PSD is designed to perform all secure cryptographic computations described above.

It is assumed also that the PSD is operatively connected to a control computer equipped with data entry or communications means and capable of driving printing means. It should be expressly noted that the control computer can be any suitable computer such as a PC, a palm pilot or a computer normally employed in postage meters to control all of its processing functions.

Figure 5:
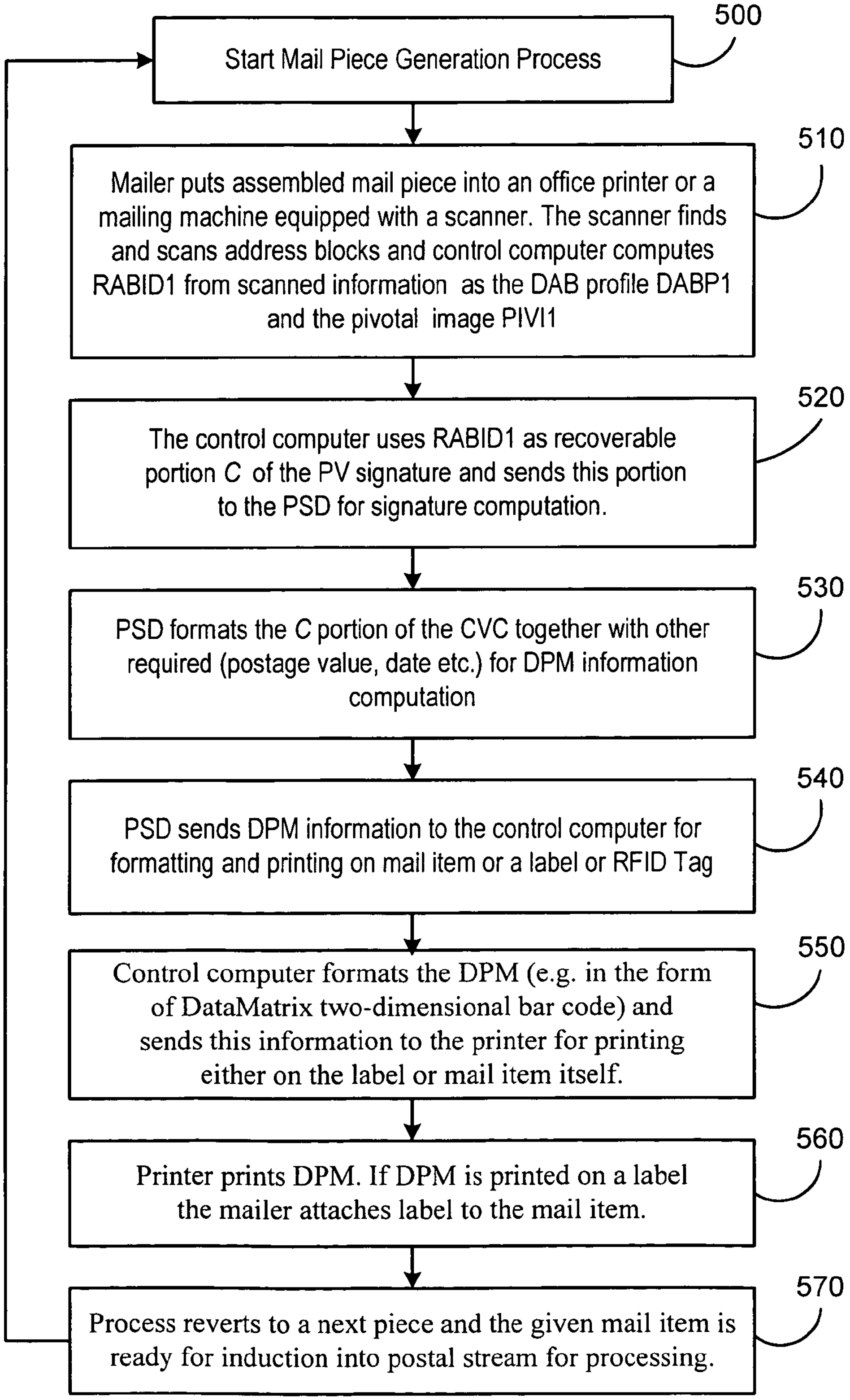
FIG. 5 is a flow chart of the mail piece generation process employing the present invention.

Referring now to FIG. 5, the mail item generation process begins at step 500. At step 510, the mailer puts assembled mail item into an office printer or a mailing machine equipped with a scanner. The scanner finds and scans address blocks and control computer computes RABID1 from scanned information as described above (i.e. the profile DABP1 and the image PIVI1). At step 520, the control computer uses RABID1 as recoverable portion C according to the method described above and sends this portion to the PSD for signature (CVC) computation. At step 530, the PSD formats the C portion of the CVC according to the routine described above together with other required (and known in the art data such as postage value, date etc.) for DPM information computation. At step 540, the PSD sends the DPM information to the control computer for formatting and printing on the mail item (or a label or other suitable media, for example, RFID Tag). At step 550, the control computer formats the DPM (e.g. in the form of DataMatrix two-dimensional bar code) and sends this information to the printer for printing either on the label or mail item itself. At step 560, the printer prints the DPM on a suitable media. If the DPM is printed on a label or a RFID tag the mailer attaches label to the mail item either manually or through a mechanized process. At step 570, the process reverts to a next piece and the given mail item is ready for induction into postal stream for processing.

Mail Item Verification Process

It is assumed for the purpose of the present invention that the DPM is physically represented on the mail item in an identifiable location in a suitable machine-readable format. For example, the DPM is customarily printed in the form of a two-dimensional bar code 36 such as DataMatrix (FIG. 2).

Figure 7:
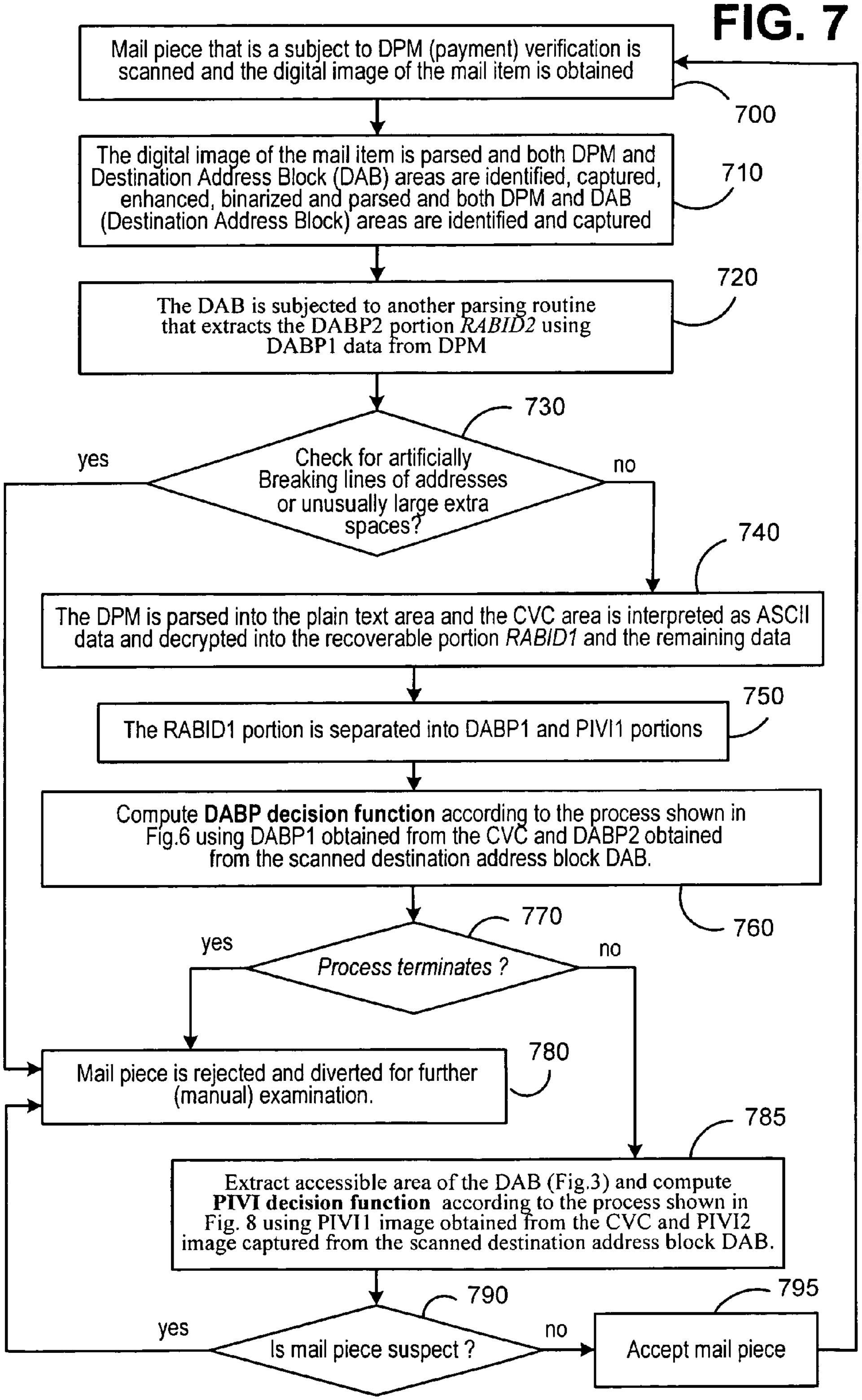
FIG. 7 is a flow chart of the verification process of the mail piece created in accordance with the process shown on FIG. 5, and FIG. 8 Flow chart of PIVI Decision Function Computation.

Referring now to FIG. 7, the mail verification process works as follows. At step 700, a mail item that is a subject to DPM (payment) verification is scanned by a mail verification system 400 (FIG. 4) and the digital image of the mail item is obtained. At step 710, the digital image of the mail item is parsed and both DPM and Destination Address Block (DAB) areas are identified, captured, enhanced (through normal digital image enhancement process) and binarized. At step 720, the DAB is subjected to another parsing routine that extracts the DABP2 portion RABID2 in accordance with the method described in the above section RABID and Distance Function. At step 740, a check is made for artificially breaking lines of addresses or unusually large extra spaces. If detected, the process continues at step 780 and terminates the verification process and reverts to manual investigation of suspect item. If none are detected, then, at step 740, the DPM is parsed into the plain text area and the CVC area is interpreted (as ASCII data) and decrypted into the recoverable portion RABID1 and the remaining data. At step 750, the RABID1 portion is separated into DABP1 and PIVI1 portions. At step 760, The DABP Decision Function is computed according to the method described in the section RABID and Distance Function using DABP1 obtained from the CVC and DABP2 obtained from the scanned destination address block DAB. This procedure either terminates the verification process and reverts to manual investigation of suspect item at step 780, or continues to step 785. At step 785, an accessible area of the DAB (FIG. 3) is extracted from DAB according to the algorithm described above. The PIVI decision function is computed using PIVI1 image obtained from the CVC and PIVI2 image captured from the scanned destination address block DAB. At step 790, a determination is made whether the mail item is suspect. If suspect, then the verification process terminates because the mail item is suspect and reverts to manual investigation. If not suspect, then at step 795, the mail item is accepted as a legitimately paid one.

While preferred embodiments of the present invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for verifying a digital postage mark, the method comprising the steps of:

scanning a mail item with an optical scanning device to obtain a digital image of the mail item, the mail item including a digital postage mark and a destination address block;

parsing, with a processor, the digital image to obtain a digital postage mark area and a destination address block area;

generating, with the processor, a first address block image digest using the digital image of the destination address block area;

retrieving a second address block image digest from the digital postage mark area;

comparing, with the processor, the first address block image digest to the second address block image digest; and accepting the mail item when the comparison of the first address block image digest to the second address block image digest is within a predetermined threshold.

2. The method of claim 1 comprising the further step of:

rejecting the mail item when the comparison of the first address block image digest to the second address block image digest is beyond a predetermined threshold.

3. The method of claim 1 wherein the second address block image digest is in a cryptographic validation code in the digital postage mark area.

4. A method for generating a mail item, the method comprising the steps of:

generating an address block image digest using a first portion of a destination address block of the mail item;

using the address block image digest as a recoverable portion of a cryptographic validation code;

formatting the recoverable portion of a cryptographic validation code with other postal data for digital postage mark information computation; and printing the digital postage mark information on one of the mail item, label or tag.

5. A method for verifying a digital postage mark, the method comprising the steps of:

scanning the mailpiece with an optical scanner device to obtain a digital image of the mailpiece, the mailpiece including the digital postage mark and a destination address block;

retrieving, with a processor, a representative portion of a destination address block image in its original form from the digital signature;

comparing, with the processor, the representative portion of the destination address block image with digital image data obtained from the scanned destination address block;

accepting the mailpiece when the comparison of the representative portion of the destination address block image with the digital image data is within a predetermined threshold.

6. The method of claim 5 comprising the further step of:

rejecting the mailpiece when the comparison of the representative portion of the destination address block image with the digital image data is beyond a predetermined threshold.

* * * * *